US012654446B2

(12) United States Patent
Hirai

(10) Patent No.: US 12,654,446 B2

(45) Date of Patent: Jun. 16, 2026

(54) LIQUID DISCHARGE HEAD, RECORDING DEVICE, AND MANUFACTURING METHOD FOR LIQUID DISCHARGE HEAD

(71) Applicant: KYOCERA CORPORATION, Kyoto (JP)

(72) Inventor: Keita Hirai, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 149 days.

(21) Appl. No.: 18/834,604

(22) PCT Filed: Jan. 27, 2023

(86) PCT No.: PCT/JP2023/002709

§ 371 (c)(1),
(2) Date: Jul. 30, 2024

(87) PCT Pub. No.: WO2023/145899

PCT Pub. Date: Aug. 3, 2023

(65) Prior Publication Data

US 2025/0135772 A1 May 1, 2025

(30) Foreign Application Priority Data

Jan. 31, 2022 (JP) ................................ 2022-012868

(51) Int. Cl.
*B41J 2/14* (2006.01)
*B41J 2/16* (2006.01)

(52) U.S. Cl.
CPC .......... *B41J 2/14233* (2013.01); *B41J 2/161* (2013.01); *B41J 2002/14491* (2013.01)

(58) Field of Classification Search
CPC .................. B41J 2/14233; B41J 2/161; B41J 2002/14491
USPC .......................................................... 347/68
See application file for complete search history.

(56) References Cited

U.S. PATENT DOCUMENTS 9,969,162 B2 5/2018 Saimen et al.
10,155,380 B2 12/2018 Tanaka et al.
2017/0217174 A1* 8/2017 Tanaka .................. B41J 2/1629

FOREIGN PATENT DOCUMENTS

JP 2017132170 A 8/2017

* cited by examiner

*Primary Examiner* — Mark Edwards
(74) *Attorney, Agent, or Firm* — HAUPTMAN HAM, LLP

(57) ABSTRACT

A liquid discharge head includes pressure chambers, a girder, a vibration plate, individual electrodes, wiring lines, and an insulation layer. The pressure chambers include first and second pressure chambers adjacent in a first direction. The girder is between the first and second pressure chambers. The vibration plate overlaps the first and second pressure chambers in a plan view. The individual electrodes respectively overlap the pressure chambers in the plan view. The wiring lines are electrically connected to the individual electrodes, respectively. The insulation layer is between the vibration plate and an on-girder wiring line overlapping the girder in the plan view. The insulation layer includes first and second surfaces respectively facing the vibration plate and the on-girder wiring line, and overlaps the girder in the plan view. A length of the first surface in the first direction is smaller than a length of the second surface in the first direction.

16 Claims, 9 Drawing Sheets

LIQUID DISCHARGE HEAD, RECORDING DEVICE, AND MANUFACTURING METHOD FOR LIQUID DISCHARGE HEAD

CROSS-REFERENCE TO RELATED APPLICATIONS

This application is national stage application of International Application No. PCT/JP2023/002709, filed on Jan. 27, 2023, incorporated herein by reference, which designates the United States, and which claims the benefit of priority from Japanese Patent Application No. 2022-012868, filed on Jan. 31, 2022.

TECHNICAL FIELD

The disclosed embodiments relate to a liquid discharge head, a recording device, and a manufacturing method for a liquid discharge head.

BACKGROUND OF INVENTION

Inkjet printers and inkjet plotters utilizing an inkjet recording method are known examples of printing apparatuses. A liquid discharge head for discharging liquid is mounted in such a printing apparatus using an inkjet method.

In such a liquid discharge head, for example, a wiring line drawn out from an individual electrode provided in a piezoelectric element for discharging liquid is disposed on a pressure chamber girder positioned between adjacent pressure chambers, thereby achieving miniaturization.

CITATION LIST

Patent Literature

Patent Document 1: JP 2017-132170 A

SUMMARY

In an aspect of an embodiment, a liquid discharge head includes two or more pressure chambers, a pressure chamber girder, a vibration plate, two or more individual electrodes, two or more wiring lines, and an insulation layer. The two or more pressure chambers include a first pressure chamber and a second pressure chamber next to each other in a first direction. The pressure chamber girder is positioned between the first pressure chamber and the second pressure chamber. The vibration plate is positioned to overlap both the first pressure chamber and the second pressure chamber in a plan view. The two or more individual electrodes are positioned respectively to overlap the two or more pressure chambers in the plan view. The two or more wiring lines are electrically connected to the two or more individual electrodes, respectively. The insulation layer is positioned between the vibration plate and an on-girder wiring line positioned to overlap the pressure chamber girder in the plan view among the two or more wiring lines. The insulation layer includes a first surface facing the vibration plate and a second surface facing the on-girder wiring line, and is positioned to overlap the pressure chamber girder in the plan view. A length of the first surface in the first direction is smaller than a length of the second surface in the first direction.

DESCRIPTION OF EMBODIMENTS

In the above-described liquid discharge head, since tolerance for position shift in a manufacturing process is small, there is room for further improvement in terms of achieving miniaturization.

Therefore, provision of a liquid discharge head in which failure caused by position shift can be reduced, a recording device, and a manufacturing method for a liquid discharge head is expected.

Embodiments of a liquid discharge head, a recording device, and a manufacturing method for a liquid discharge head disclosed in the present application will be described below with reference to the accompanying drawings. The present disclosure is not limited by the following embodiments. Note that the drawings are schematic and that the dimensional relationships between elements, the proportions of the elements, and the like may differ from the actual ones. There may be differences between the drawings in terms of dimensional relationships, proportions, and the like.

In the embodiments described below, expressions such as "constant", "orthogonal", "perpendicular", and "parallel"

may be used, but these expressions do not mean strictly "constant", "orthogonal", "perpendicular", and "parallel". In other words, it is assumed that the above expressions allow for deviations in manufacturing accuracy, installation accuracy, or the like.

Embodiments can be appropriately combined so as not to contradict each other in terms of processing content. In the following embodiments, the same portions are denoted by the same reference signs, and redundant explanations are omitted.

EMBODIMENT

Printer Configuration

Figure 1:
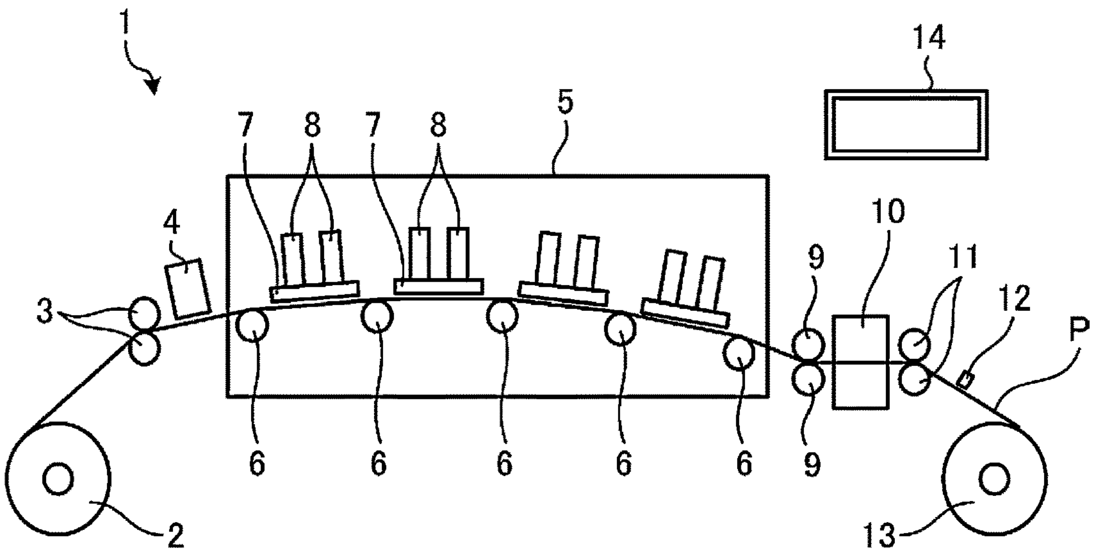
FIG. 1 is a front view schematically illustrating an overall front of a printer according to an embodiment.
Figure 2:
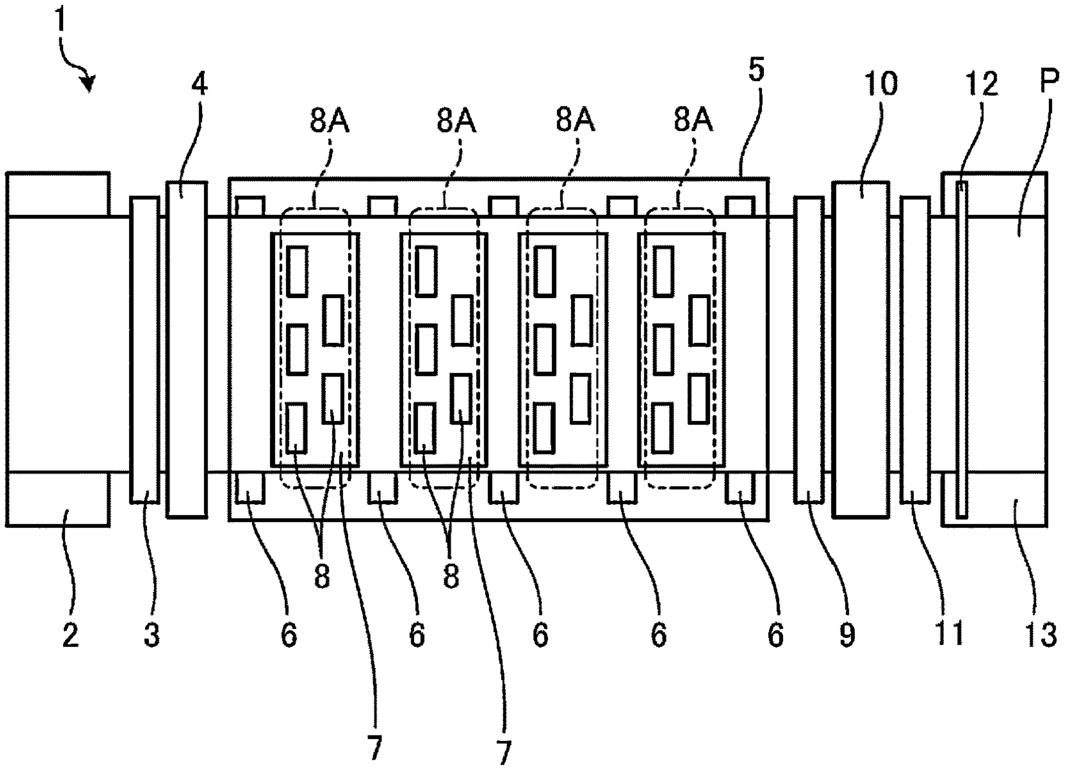
FIG. 2 is a plan view schematically illustrating an overall plan of the printer according to the embodiment.

First, with reference to FIG. 1 and FIG. 2, a description will be given of an overview of a printer serving as an example of a recording device according to an embodiment. FIG. 1 is a front view schematically illustrating an overall front of the printer according to the embodiment. FIG. 2 is a plan view schematically illustrating an overall plan of the printer according to the embodiment. The printer according to the embodiment is, for example, a color inkjet printer.

As illustrated in FIG. 1, a printer 1 includes a paper feed roller 2, guide rollers 3, an applicator 4, a head case 5, two or more transport rollers 6, two or more frames 7, two or more liquid discharge heads 8, transport rollers 9, a dryer 10, transport rollers 11, a sensor 12, and a collection roller 13. The transport roller 6 is an example of a transporter.

The printer 1 further includes a controller 14 configured to control each part of the printer 1. The controller 14 controls operation of the paper feed roller 2, the guide rollers 3, the applicator 4, the head case 5, the two or more transport rollers 6, the two or more frames 7, the two or more liquid discharge heads 8, the transport rollers 9, the dryer 10, the transport rollers 11, the sensor 12, and the collection roller 13.

By landing droplets on a printing sheet P, the printer 1 records images and characters on the printing sheet P. The printing sheet P is an example of a recording medium. The printing sheet P is rolled on the paper feed roller 2 prior to use. The printer 1 conveys the printing sheet P from the paper feed roller 2 to an inside of the head case 5 via the guide rollers 3 and the applicator 4.

The applicator 4 uniformly applies a coating agent over the printing sheet P. This can perform surface treatment on the printing sheet P, improving printing quality of the printer 1.

The head case 5 houses the two or more transport rollers 6, the two or more frames 7, and the two or more liquid discharge heads 8. The inside of the head case 5 is formed with a space separated from an outside except for a part connected to the outside such as parts where the printing sheet P enters and exits.

As required, the controller 14 controls at least one of controllable factors of the inside space of the head case 5, such as temperature, humidity, and air pressure. The transport rollers 6 convey the printing sheet P near the liquid discharge heads 8 inside the head case 5.

The frames 7 are rectangular flat plates and are positioned above and close to the printing sheet P to be conveyed by the transport rollers 6. As illustrated in FIG. 2, the frames 7 are positioned having a longitudinal direction orthogonal to a conveyance direction of the printing sheet P. Inside the head case 5, the two or more (e.g., four) frames 7 are positioned at predetermined intervals along the conveyance direction of the printing sheet P.

Liquid, for example, ink, is supplied to the liquid discharge heads 8 from a liquid tank (not illustrated). The liquid discharge heads 8 discharge the liquid supplied from the liquid tank.

The controller 14 controls the liquid discharge heads 8 based on data of an image, characters, or the like to discharge the liquid toward the printing sheet P. A distance between each liquid discharge head 8 and the printing sheet P is, for example, approximately 0.5 mm to 20 mm.

Each of the liquid discharge heads 8 is fixed to the frame 7. The liquid discharge heads 8 are positioned having the longitudinal direction orthogonal to the conveyance direction of the printing sheet P.

That is, the printer 1 according to the present embodiment is a so-called line printer in which the liquid discharge heads 8 are fixed inside the printer 1. Note that, the printer 1 according to the present embodiment is not limited to a line printer and may also be a so-called serial printer.

The serial printer is a printer employing a method of alternately performing operations of recording while moving the liquid discharge heads 8 in a manner such as reciprocation in a direction intersecting (e.g., substantially orthogonal to) the conveyance direction of the printing sheet P, and conveying the printing sheet P.

As illustrated in FIG. 2, the two or more (e.g., five) liquid discharge heads 8 are fixed to one of the frames 7. FIG. 2 illustrates an example in which three of the liquid discharge heads 8 are positioned on a forward side and two of the liquid discharge heads 8 are positioned on a rearward side, in the conveyance direction of the printing sheet P. Further, the liquid discharge heads 8 are positioned without their centers overlapping in the conveyance direction of the printing sheet P.

The two or more liquid discharge heads 8 positioned in one of the frames 7 form a head group 8A. Four of the head groups 8A are positioned along the conveyance direction of the printing sheet P. The liquid discharge heads 8 belonging to the same head group 8A are supplied with ink of four colors. As a result, the printer 1 can perform printing with the four colors of ink using the four head groups 8A.

The colors of the ink discharged from the respective liquid discharge heads 8 are, for example, magenta (M), yellow (Y), cyan (C), and black (K). The controller 14 can print a color image on the printing sheet P by controlling the respective liquid discharge heads 8 to discharge the two or more colors of ink onto the printing sheet P.

Note that surface treatment may be performed on the printing sheet P, by discharging a coating agent from the liquid discharge head 8 onto the printing sheet P.

The number of liquid discharge heads 8 included in one of the head groups 8A and the number of head groups 8A mounted in the printer 1 can be changed as appropriate in accordance with printing targets and printing conditions. For example, when printing is performed in a printable range with a single liquid discharge head 8, only a single liquid discharge head 8 may be provided in the printer 1.

The printing sheet P printed inside the head case 5 is conveyed to the outside of the head case 5 by the transport rollers 9 and passes through the inside of the dryer 10. The dryer 10 dries the printing sheet P printed. The printing sheet P dried by the dryer 10 is conveyed by the transport rollers 11 and then collected by the collection roller 13.

In the printer 1, by drying the printing sheet P with the dryer 10, bonding, or rubbing of an undried liquid, between the printing sheets P overlapped with each other and rolled at the collection roller 13 can be suppressed.

The sensor 12 includes a position sensor, a speed sensor, a temperature sensor, or the like. Based on information from the sensor 12, the controller 14 can determine a state of each part of the printer 1 and control each part of the printer 1.

In the printer 1 described above, the printing sheet P is the printing target (i.e., the recording medium), but the printing target in the printer 1 is not limited to the printing sheet P, and a roll type fabric or the like may be the printing target.

The printer 1 may convey the printing sheet P put on a conveyor belt instead of directly conveying the printing sheet P. By using the conveyor belt, the printer 1 can perform printing on a sheet of paper, a cut cloth, wood, a tile, or the like as a printing target.

The printer 1 may discharge a liquid containing electrically conductive particles from the liquid discharge heads 8, to print a wiring pattern or the like of an electronic device. The printer 1 may discharge a liquid containing a predetermined amount of a liquid chemical agent or a liquid containing the chemical agent from the liquid discharge heads 8 onto a reaction vessel or the like to produce chemicals.

The printer 1 may also include a cleaner for cleaning the liquid discharge heads 8. The cleaner cleans the liquid discharge heads 8 by, for example, a wiping process or a capping process.

The wiping process is, for example, a process of wiping a surface of a portion from which liquid is discharged using a flexible wiper, thereby removing the liquid attached to the liquid discharge head 8.

The capping process is performed as follows, for example. First, a cap is put to cover a portion to which liquid is discharged, for example, a bottom surface 8*e* (see FIG. 4) of the liquid discharge head 8 (this is called capping). As a result, a substantially sealed space is formed between the bottom surface 8*e* and the cap.

The discharge of liquid is then repeated in such a hermetically sealed space. Consequently, a liquid having a viscosity higher than that in a normal state, foreign matter, or the like that has clogged a nozzle 23 (see FIG. 4) can be removed.

Configuration of Liquid Discharge Head

First Embodiment

Figure 3:
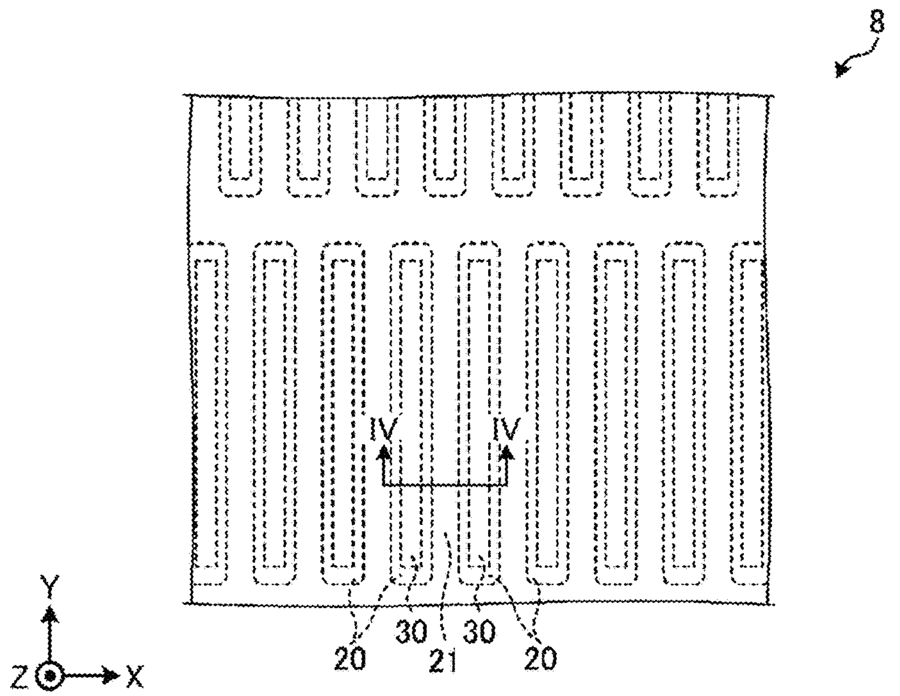
FIG. 3 is a plan view illustrating an example of an overall configuration of a liquid discharge head according to a first embodiment.
Figure 4:
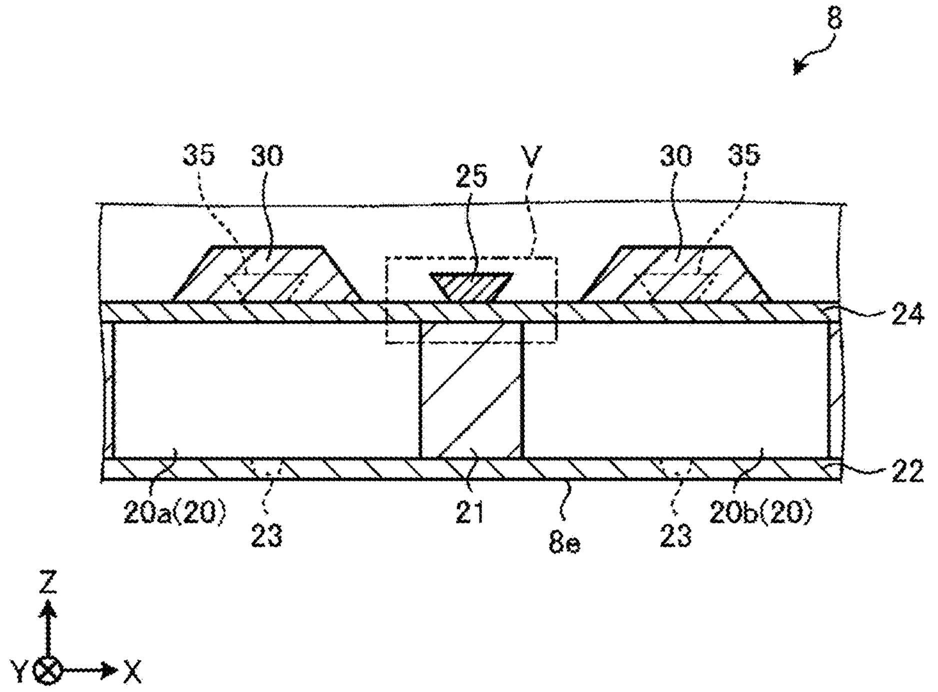
FIG. 4 is a cross-sectional view taken along a line IV-IV illustrated in FIG. 3.

Next, a configuration of the liquid discharge head 8 according to a first embodiment will be described with reference to FIG. 3 to FIG. 5. FIG. 3 is a plan view illustrating an example of an overall configuration of the liquid discharge head according to the first embodiment. FIG. 4 is a cross-sectional view taken along a line IV-IV illustrated in FIG. 3.

Note that, for the sake of clarity, FIG. 3 illustrates a three-dimensional orthogonal coordinate system including a Z axis in which a vertically upward direction is a positive direction. Such an orthogonal coordinate system may also be presented in other drawings used in the description below. In the following description, for convenience, a direction in which the bottom surface 8*e* (see FIG. 4) of the liquid discharge head 8 is positioned in the liquid discharge head 8, that is, a Z axis negative direction side may be referred to as “lower” or “downward”, and a Z axis positive direction side may be referred to as “upper” or “upward”.

As illustrated in FIG. 3, the liquid discharge head 8 includes a pressure chamber 20, a pressure chamber girder 21, and a piezoelectric element 30. The pressure chamber 20 is a hollow region having a substantially rectangular planar shape with corner portions that are rounded. As illustrated in FIG. 3, the liquid discharge head 8 includes two or more of the pressure chambers 20 positioned such that a longitudinal direction is in a Y axis direction. Liquid is supplied into the pressure chamber 20 from a supply flow path (not illustrated).

The pressure chamber girder 21 is positioned between the pressure chambers 20 next to each other in an X axis direction. The two or more pressure chambers 20 and pressure chamber girder 21 are alternately arrayed in the X axis direction to form a pressure chamber group. Two or more of such pressure chamber groups are arrayed in the Y axis direction. Note that two or more of the pressure chamber groups may be arrayed in the Y axis direction and the X axis direction.

Each piezoelectric element 30 is positioned to overlap the pressure chamber 20 in a plan view. The piezoelectric element 30 is displaced by energization to change an internal pressure of the pressure chamber 20.

As illustrated in FIG. 4, the liquid discharge head 8 further includes a nozzle layer 22, a vibration plate 24, an individual electrode 35, and a wiring line 25.

The nozzle layer 22 is positioned on a side of the bottom surface 8*e* of the liquid discharge head 8 and closes a lower end side of the pressure chamber 20. The nozzle layer 22 includes the nozzle 23. The nozzle 23 is a through hole penetrating the nozzle layer 22 in a thickness direction (a Z axis direction), and liquid supplied to an inside of the pressure chamber 20 is discharged from the nozzle 23 to an outside.

The two or more pressure chambers 20 include a first pressure chamber 20*a* and a second pressure chamber 20*b* next to each other in the X axis direction with the pressure chamber girder 21 interposed therebetween. The X axis direction is an example of a first direction.

The vibration plate 24 is positioned on the pressure chamber 20 and the pressure chamber girder 21. As illustrated in FIG. 4, the vibration plate 24 is positioned to overlap both the first pressure chamber 20*a* and the second pressure chamber 20*b* in a plan view.

Each individual electrode 35 is positioned to overlap the pressure chamber 20 in a plan view. Each individual electrode 35 is electrically connected to the piezoelectric element 30 corresponding thereto. The individual electrode 35 according to the embodiment is positioned on the vibration plate 24. The individual electrode 35 may be positioned side by side with the piezoelectric element 30, or may be positioned above or below the piezoelectric element 30.

The wiring line 25 is positioned to overlap the pressure chamber girder 21 in a plan view. The wiring line 25 is an example of an on-girder wiring line. The wiring line 25 according to the embodiment is positioned on the vibration plate 24. The wiring line 25 is electrically connected to, for example, any one of the two or more individual electrodes 35. The wiring line 25 extends in the Y axis direction intersecting the X axis direction.

Next, a configuration of the wiring line 25 according to the present embodiment and a vicinity thereof will be further described with reference to FIG. 5. FIG. 5 is an enlarged cross-sectional view of a region V indicated in FIG. 4.

Figure 5:
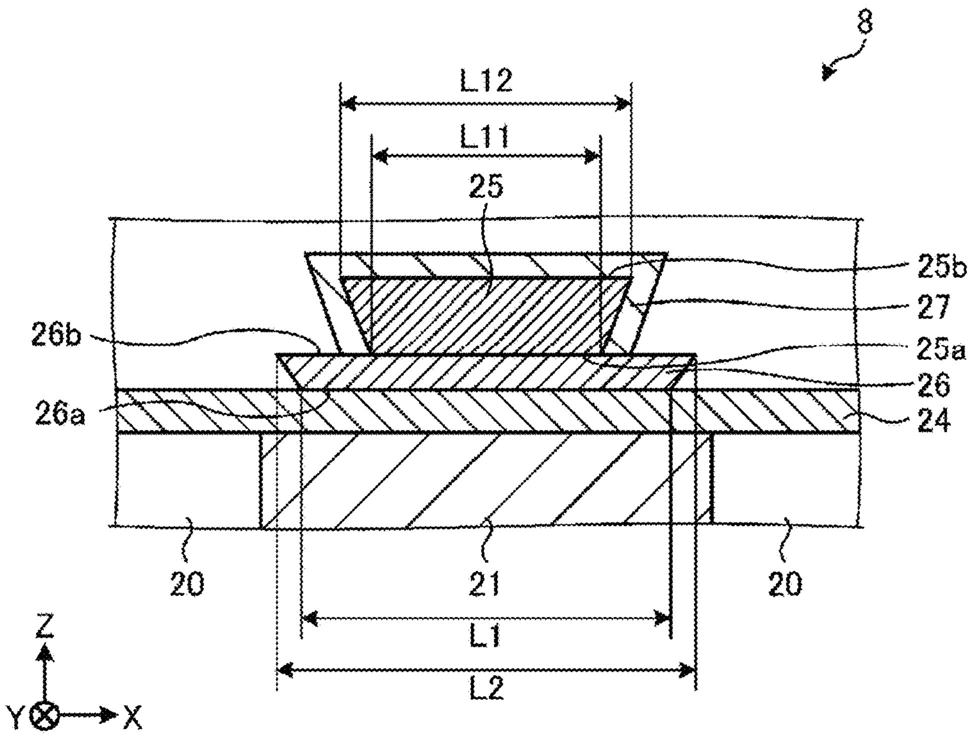
FIG. 5 is an enlarged cross-sectional view of a region V illustrated in FIG. 4.

As illustrated in FIG. 5, the liquid discharge head 8 further includes an insulation layer 26. The insulation layer 26 is positioned to overlap the pressure chamber girder 21 in a plan view. The insulation layer 26 is positioned between the vibration plate 24 and the wiring line 25.

Figure 6:
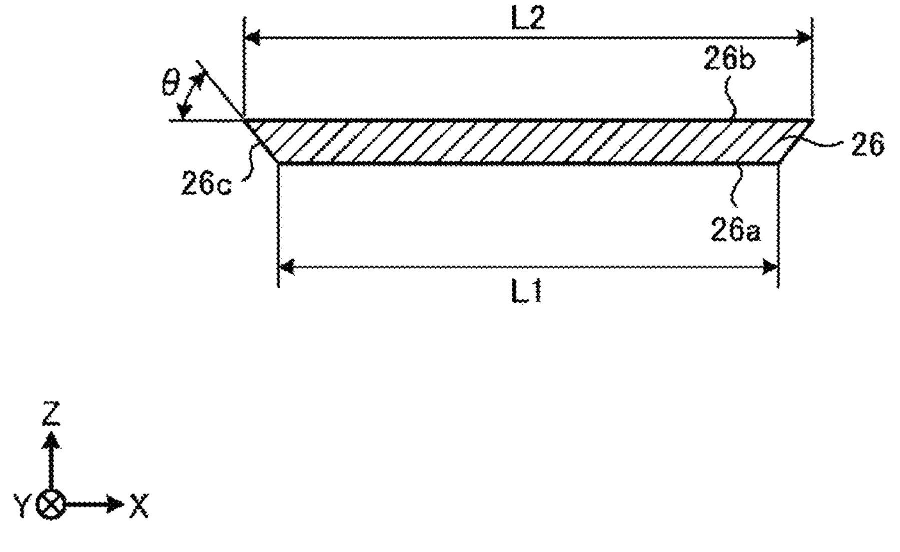
FIG. 6 is a cross-sectional view illustrating an example of a configuration of an insulation layer included in the liquid discharge head according to the first embodiment.

Here, the insulation layer 26 will be further described in detail using FIG. 5 and FIG. 6. FIG. 6 is a cross-sectional view illustrating an example of a configuration of the insulation layer included in the liquid discharge head according to the first embodiment.

The insulation layer 26 includes a first surface 26*a* facing the vibration plate 24, a second surface 26*b* facing the wiring line 25, and a third surface 26*c* connecting the first surface 26*a* and the second surface 26*b*. A length L1 of the first surface 26*a* in the X axis direction is smaller than a length L2 of the second surface 26*b* in the X axis direction. As a result, the insulation layer 26 is less likely to be positioned on the pressure chamber 20, and thus failure of hindering displacement of the pressure chamber 20 can be reduced. An increase in size of the liquid discharge head 8 due to manufacturing convenience in consideration of a possibility of position shift of the insulation layer 26 from a predetermined position in the X axis direction can be reduced.

Since the length L2 of the second surface 26*b* of the insulation layer 26 is larger than the length L1 of the first surface 26*a*, even when position shift of the wiring line 25 from a predetermined position in the X axis direction occurs, an insulation property for the wiring line 25 is easily secured.

As illustrated in FIG. 6, an angle θ formed by the first surface 26*a* and the third surface 26*c* can be set to, for example, about 5° to 20°. A ratio of the length L1 of the first surface 26*a* to the length L2 of the second surface 26*b*, L1/L2×100, can be set to 75(%) to 99(%), particularly 75(%) to 97(%).

Returning to FIG. 5, the wiring line 25 includes a first end surface 25*a* facing the insulation layer 26 and a second end surface 25*b* positioned opposite to the first end surface 25*a*. A length L11 of the first end surface 25*a* in the X axis direction may be smaller than a length L12 of the second end surface 25*b* in the X axis direction. As a result, the wiring line 25 is less likely to be positioned on the pressure chamber 20, and thus the failure of hindering the displacement of the pressure chamber 20 can be reduced. An increase in size of the liquid discharge head 8 due to manufacturing convenience in consideration of a possibility of position shift of the wiring line 25 from a predetermined position in the X axis direction can be reduced.

Since the length L12 of the second end surface 25*b* of the wiring line 25 is larger than the length L11 of the first end surface 25*a*, a cross-sectional area of the wiring line 25 can be increased and an electrical resistance of the wiring line 25 can be reduced as compared with a case where the length L12 is equal to or less than the length L11.

The liquid discharge head 8 may further include a protective layer 27 that covers the wiring line 25. As a result, durability of the wiring line 25 can be enhanced. The protective layer 27 may have, for example, an insulation property. A material of the protective layer 27 may be the same as or different from a material of the insulation layer 26.

Note that FIG. 6 illustrates an example of the configuration of the liquid discharge head 8, which may further include a member other than the members illustrated in FIG. 6.

Second Embodiment

Figure 7:
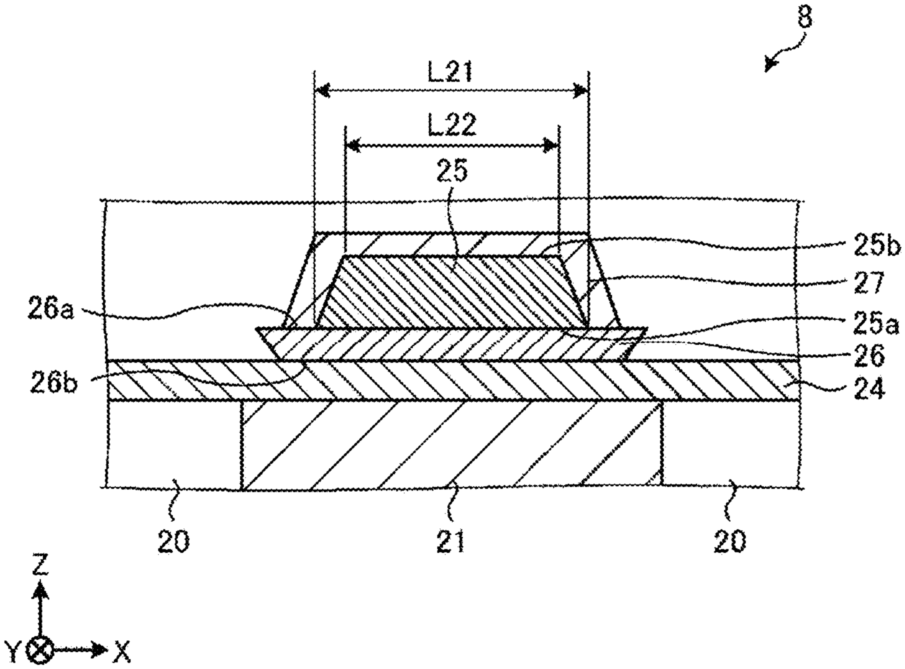
FIG. 7 is a cross-sectional view illustrating an example of an overall configuration of a liquid discharge head according to a second embodiment.

FIG. 7 is a cross-sectional view illustrating an example of an overall configuration of a liquid discharge head according to a second embodiment. As illustrated in FIG. 7, in the wiring line 25, a length L21 of the first end surface 25*a* in the X axis direction may be larger than a length L22 of the second end surface 25*b* in the X axis direction. Accordingly, since a contact surface area between the wiring line 25 and the insulation layer 26 can be increased, for example, adhesiveness of the wiring line 25 is improved.

Third Embodiment

Figure 8:
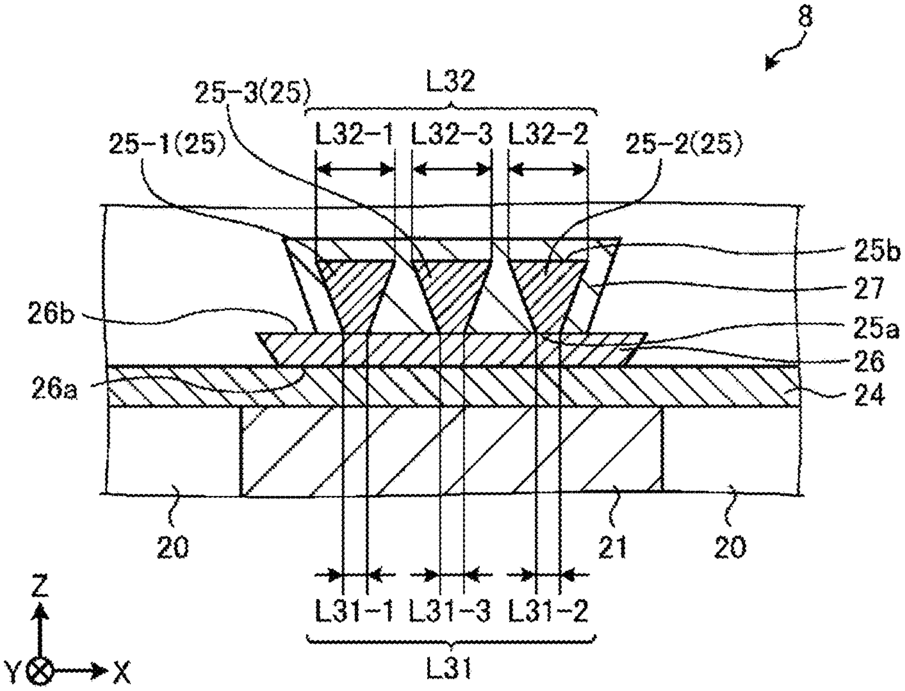
FIG. 8 is a cross-sectional view illustrating an example of an overall configuration of a liquid discharge head according to a third embodiment.

FIG. 8 is a cross-sectional view illustrating an example of an overall configuration of a liquid discharge head according to a third embodiment. The liquid discharge head 8 illustrated in FIG. 8 includes two or more of the wiring lines 25 arranged in the X axis direction. The wiring lines 25 include three wiring lines 25-1 to 25-3. A total length L31 of lengths L31-1 to L31-3 of the first end surfaces 25*a* of the wiring lines 25 in the X axis direction may be smaller than a total length L32 of lengths L32-1 to L32-3 of the second end surfaces 25*b* of the wiring lines 25 in the X axis direction. As a result, the one or more wiring lines 25 are less likely to be positioned on the pressure chamber 20, and thus failure of hindering displacement of the pressure chamber 20 can be reduced. An increase in size of the liquid discharge head 8 due to manufacturing convenience in consideration of a possibility of position shift of the wiring line 25 from a predetermined position in the X axis direction can be reduced.

Since the total length L32 of the second end surfaces 25*b* of the wiring lines 25 is larger than the total length L31 of the first end surfaces 25*a*, cross-sectional areas of the wiring lines 25 can be increased and electrical resistances of the wiring lines 25 can be reduced as compared with a case where the total length L32 is equal to or less than the total length L31.

FIG. 8 illustrates the liquid discharge head 8 in which the three wiring lines 25 are arranged in the X axis direction, but the number of wiring lines 25 arranged in the X axis direction may be two or four or more.

Fourth Embodiment

Figure 9:
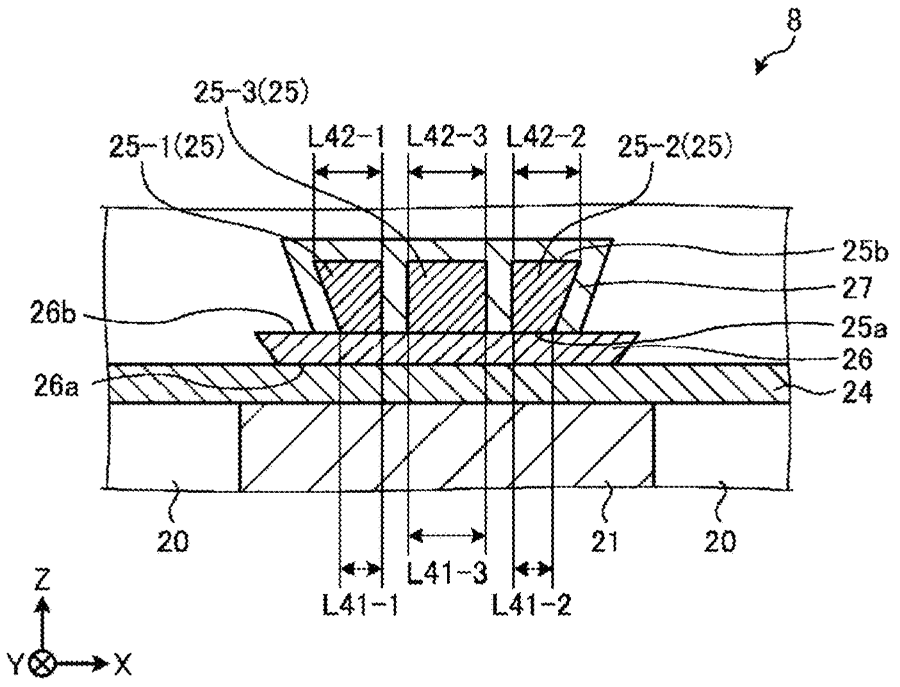
FIG. 9 is a cross-sectional view illustrating an example of an overall configuration of a liquid discharge head according to a fourth embodiment.

FIG. 9 is a cross-sectional view illustrating an example of an overall configuration of a liquid discharge head according to a fourth embodiment. The liquid discharge head 8 illustrated in FIG. 9 includes three or more of the wiring lines 25 arranged in the X axis direction. In the wiring lines 25 positioned at both ends in the X axis direction among the three or more wiring lines 25 arranged in the X axis direction, that is, the wiring lines 25-1 and 25-2, a sum of lengths of the first end surfaces 25*a* in the X axis direction (=a length (L41-1)+a length (41-2)) may be smaller than a sum of lengths of the second end surfaces 25*b* in the X axis direction (=a length (L42-1)+a length (42-2)). As a result, the one or more wiring lines 25 are less likely to be positioned on the pressure chamber 20, and thus failure of hindering displacement of the pressure chamber 20 can be reduced. An increase in size of the liquid discharge head 8 due to manufacturing convenience in consideration of a possibility of position shift of the wiring line 25 from a predetermined position in the X axis direction can be reduced.

In the wiring line 25-3, which is the wiring line 25 positioned in a center portion in the X axis direction among the three or more wiring lines 25 arranged in the X axis direction, a difference between a length L42-3 of the second end surface 25*b* in the X axis direction and a length 41-3 of the first end surface 25*a* may be smaller than a difference between the sum of the lengths of the second end surfaces 25*b* in the X axis direction and the sum of the lengths of the first end surfaces 25*a* in the wiring lines 25-1 and 25-2 positioned at both the ends in the X axis direction. Accordingly, cross-sectional areas of the wiring lines 25 can be ensured while ensuring a wiring pitch in a predetermined region above the insulation layer 26, and electrical resistances of the wiring lines 25 can be reduced. In this case, the length L41-3 may be the same as or different from the length 42-3.

FIG. 9 illustrates the liquid discharge head 8 in which the three wiring lines 25 are arranged in the X axis direction so that one of the wiring lines 25 is positioned in the center portion in the X axis direction, but the number of wiring lines 25 arranged in the X axis direction may be four or more. In such a case, two or more of the wiring lines 25 excluding the wiring lines 25-1 and 25-2 positioned at both the ends in the X axis direction are positioned in the center portion in the X axis direction. In this case, in two or more on-girder wiring lines positioned in the center portion in the X axis direction, a difference between a sum of lengths of the second end surfaces 25*b* in the X axis direction and a sum of lengths of the first end surfaces 25*a* in the X axis direction may be smaller than a difference between a sum of lengths of the second end surfaces 25*b* in the X axis direction and a sum of lengths of the first end surfaces 25*a* in the X axis direction in the wiring lines 25-1 and 25-2 positioned at both ends in the X axis direction. Accordingly, cross-sectional areas of the wiring lines 25 can be ensured while ensuring a wiring pitch in a predetermined region above the insulation layer 26, and electrical resistances of the wiring lines 25 can be reduced.

Fifth Embodiment

Figure 10:
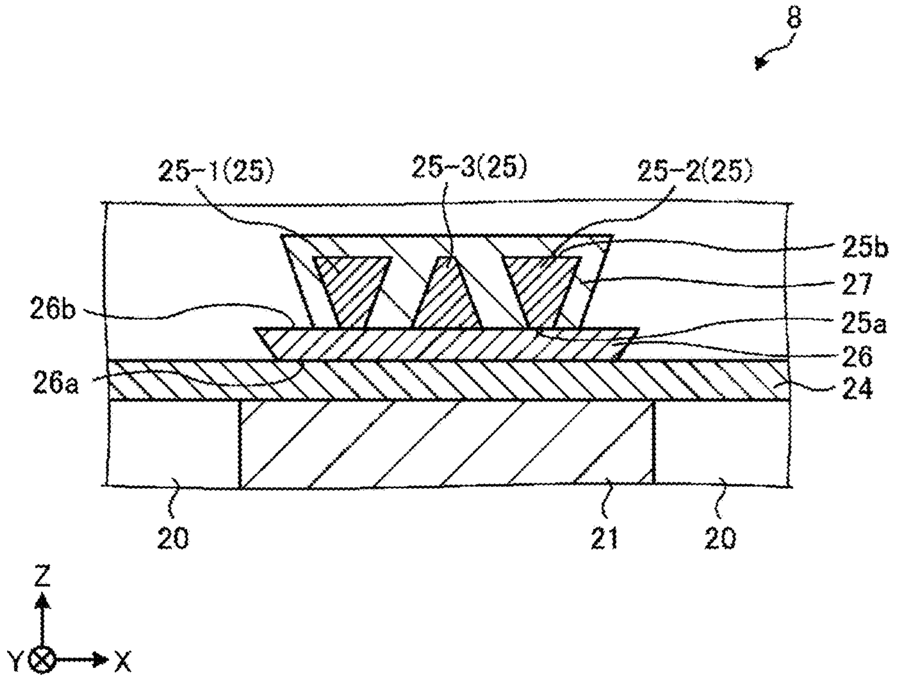
FIG. 10 is a cross-sectional view illustrating an example of an overall configuration of a liquid discharge head according to a fifth embodiment.

FIG. 10 is a cross-sectional view illustrating an overall configuration of a liquid discharge head according to a fifth embodiment. As illustrated in FIG. 10, the liquid discharge head 8 according to the present embodiment is different from the liquid discharge head 8 illustrated in FIG. 8 in a cross-sectional shape of the wiring line 25-3 positioned in a center portion in the X axis direction. To be more specific, in each of the wiring lines 25-1 and 25-2, a length of the first end surface 25*a* in the X axis direction is smaller than a length of the second end surface 25*b*, on the other hand, a length of the first end surface 25*a* in the X axis direction is larger than a length of the second end surface 25*b* in the wiring line 25-3. As a result, the one or more wiring lines 25 are less likely to be positioned on the pressure chamber 20, and thus failure of hindering displacement of the pressure chamber 20 can be reduced. An increase in size of the liquid discharge head 8 due to manufacturing convenience in consideration of a possibility of position shift of the wiring line 25 from a predetermined position in the X axis direction can be reduced. The two or more wiring lines 25 can be efficiently arranged in a predetermined region above the insulation layer 26. In this case, cross-sectional areas of the two or more wiring lines 25 may be the same. Accordingly, electrical resistances of the two or more wiring lines 25 can be made uniform, thereby improving performance of the liquid discharge head 8.

FIG. 10 illustrates the liquid discharge head 8 in which the three wiring lines 25 are arranged in the X axis direction so that one of the wiring lines 25 is positioned in the center portion in the X axis direction, but the number of wiring lines 25 arranged in the X axis direction may be four or more. In such a case, for one or more of the wiring lines 25 positioned in the center portion in the X axis direction, a length of the first end surface 25*a* in the X axis direction may be larger than a length of the second end surface 25*b*. As a result, the one or more wiring lines 25 are less likely to be positioned on the pressure chamber 20, and thus failure of hindering displacement of the pressure chamber 20 can be reduced. An increase in size of the liquid discharge head 8 due to manufacturing convenience in consideration of a possibility of position shift of the wiring line 25 from a predetermined position in the X axis direction can be reduced. The two or more wiring lines 25 can be efficiently arranged in a predetermined region above the insulation layer 26. At this time, two or more of the wiring lines 25 positioned in the center portion in the X axis direction may be the same as each other in terms of cross-sectional area, and may be the same as the wiring lines 25 positioned at both ends in the X axis direction in terms of cross-sectional area. Accordingly, electrical resistances of the two or more wiring lines 25 can be made uniform, thereby improving performance of the liquid discharge head 8.

Sixth Embodiment

Figure 11A:
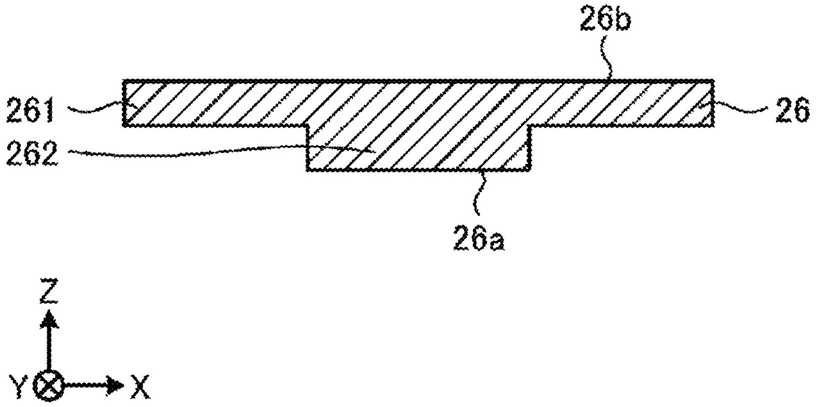
FIG. 11A is a cross-sectional view illustrating an example of a configuration of an insulation layer included in a liquid discharge head according to a sixth embodiment.
Figure 11B:
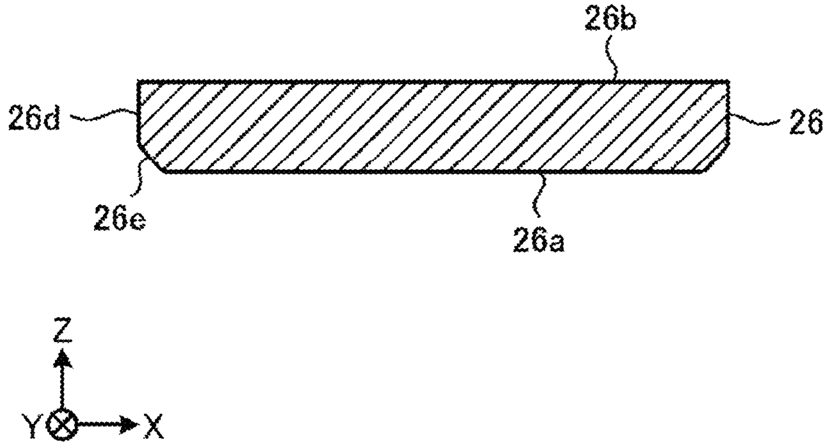
FIG. 11B is a cross-sectional view illustrating another example of the configuration of the insulation layer included in the liquid discharge head according to the sixth embodiment.
Figure 11C:
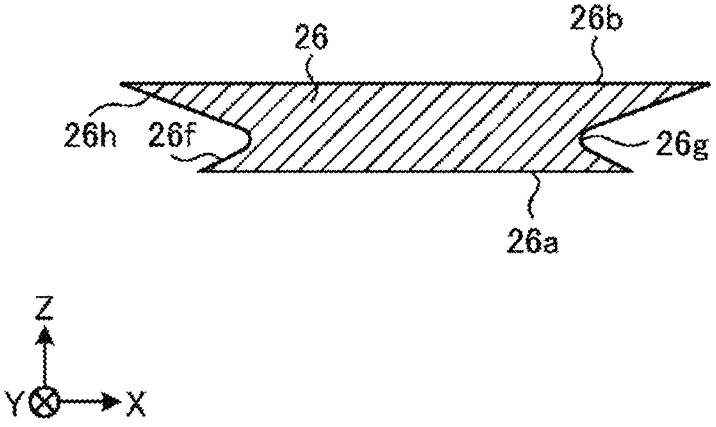
FIG. 11C is a cross-sectional view illustrating a still another example of the configuration of the insulation layer included in the liquid discharge head according to the sixth embodiment.

FIG. 11A is a cross-sectional view illustrating an example of a configuration of an insulation layer included in a liquid discharge head according to a sixth embodiment. FIG. 11B and FIG. 11C are cross-sectional views illustrating other examples of the configuration of the insulation layer included in the liquid discharge head according to the sixth embodiment.

As illustrated in FIG. 11A, the insulation layer 26 may include a first portion 261 having the same width in the X axis direction as that of the first surface 26*a*, and a second portion 262 having the same width in the X axis direction as that of the second surface 26*b*.

As illustrated in FIG. 11B, the insulation layer 26 may include a fourth surface 26*d* extending along a YZ plane from both ends of the second surface 26*b* in the X axis direction, and a fifth surface 26*e* connecting the fourth surface 26*d* and the first surface 26*a*. Manufacturing of such an insulation layer 26 is relatively easy, for example.

As illustrated in FIG. 11C, the insulation layer 26 may include a first inclined surface 26*f* in which a width in the X axis direction gradually decreases as viewed from the first surface 26*a* toward a constricted portion 26*g*, and a second inclined surface 26*h* in which a width in the X axis direction gradually increases as viewed from the constricted portion 26*g* toward the second surface 26*b*. According to such insulation layer 26, for example, even when dew condensation occurs on a surface of the insulation layer 26, the insulation layer 26 is easily dried, and durability is improved.

Note that, the insulation layer 26 according to the present embodiment can be manufactured by appropriately combining known methods such as dry etching and a lift-off method. For example, the shape of the insulation layer 26 illustrated in each of FIG. 11A to FIG. 11C may be applied to the shape of the wiring line 25.

Seventh Embodiment

Figure 12:
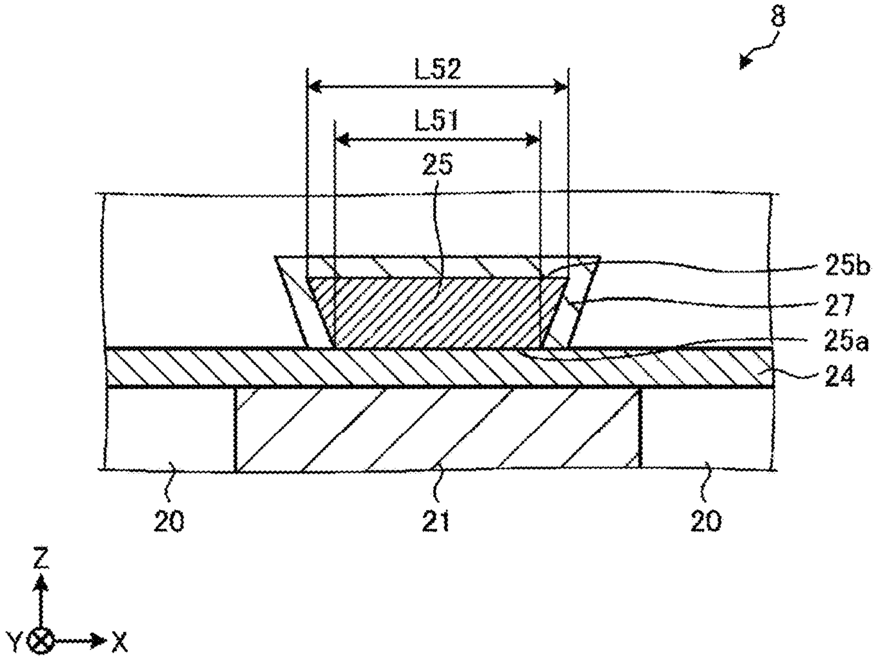
FIG. 12 is a cross-sectional view illustrating an example of an overall configuration of a liquid discharge head according to a seventh embodiment.

FIG. 12 is a cross-sectional view illustrating an example of an overall configuration of a liquid discharge head according to a seventh embodiment. In the liquid discharge head 8 illustrated in FIG. 12, the wiring line 25 positioned to overlap the pressure chamber girder 21 in a plan view is positioned on the vibration plate 24. The wiring line 25 includes the first end surface 25*a* facing the vibration plate 24 and the second end surface 25*b* positioned opposite to the first end surface 25*a*. A length L51 of the first end surface 25*a* in the X axis direction is smaller than a length of the second end surface 25*b*. As a result, the wiring line 25 is less likely to be positioned on the pressure chamber 20, and thus the failure of hindering the displacement of the pressure chamber 20 can be reduced. An increase in size of the liquid discharge head 8 due to manufacturing convenience in consideration of a possibility of position shift of the wiring line 25 from a predetermined position in the X axis direction can be reduced.

Since a length L52 of the second end surface 25*b* of the wiring line 25 is larger than the length L51 of the first end surface 25*a*, a cross-sectional area of the wiring line 25 can be increased and an electrical resistance of the wiring line 25 can be reduced as compared with a case where the length L52 is equal to or less than the length L51.

Eighth Embodiment

Figure 13:
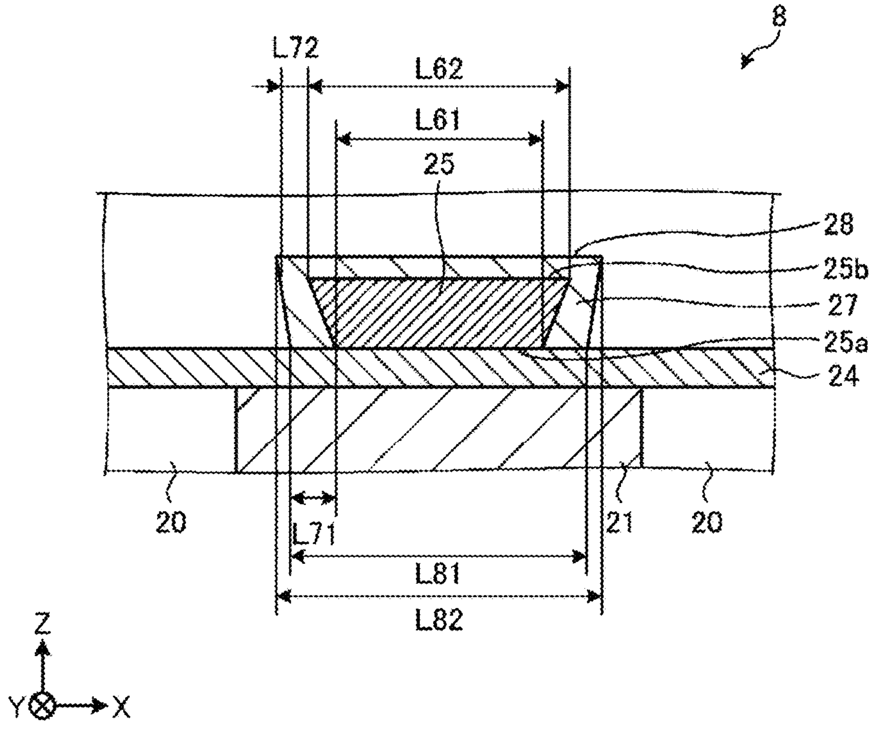
FIG. 13 is a cross-sectional view illustrating an example of an overall configuration of a liquid discharge head according to an eighth embodiment.

FIG. 13 is a cross-sectional view illustrating an example of an overall configuration of a liquid discharge head according to an eighth embodiment. As illustrated in FIG. 13, in the liquid discharge head 8, a length L61 of the first end surface 25*a* in the X axis direction may be smaller than a length L62 of the second end surface 25*b* in the X axis direction. A thickness L71 in the X axis direction of the protective layer 27 along the first end surface 25*a* of the wiring line 25 may be larger than a thickness L72 in the X axis direction of the protective layer 27 along the second end surface 25*b*. A length L82 in the X axis direction of an end surface 28 of the protective layer 27 positioned opposite to the first end surface 25*a* may be equal to or larger than a length L81 in the X axis direction of the wiring line 25 and the protective layer 27 along the first end surface 25*a*, the wiring line 25 being interposed between the protective layer 27. As a result, the wiring line 25 is less likely to be positioned on the pressure chamber 20, and thus the failure of hindering the displacement of the pressure chamber 20 can be reduced. An increase in size of the liquid discharge head 8 due to manufacturing convenience in consideration of a possibility of position shift of the wiring line 25 from a predetermined position in the X axis direction can be reduced.

By making the thickness L71 in the X axis direction of the protective layer 27 along the first end surface 25*a* larger than the thickness L72 in the X axis direction of the protective layer 27 along the second end surface 25*b*, for example, even when dew condensation or the like occurs in a vicinity of an interface between the vibration plate 24 and the protective layer 27, water resistance protection performance against water droplets that are likely to remain in an acute angle portion can be increased, and reliability can be further improved.

Ninth Embodiment

Figure 14:
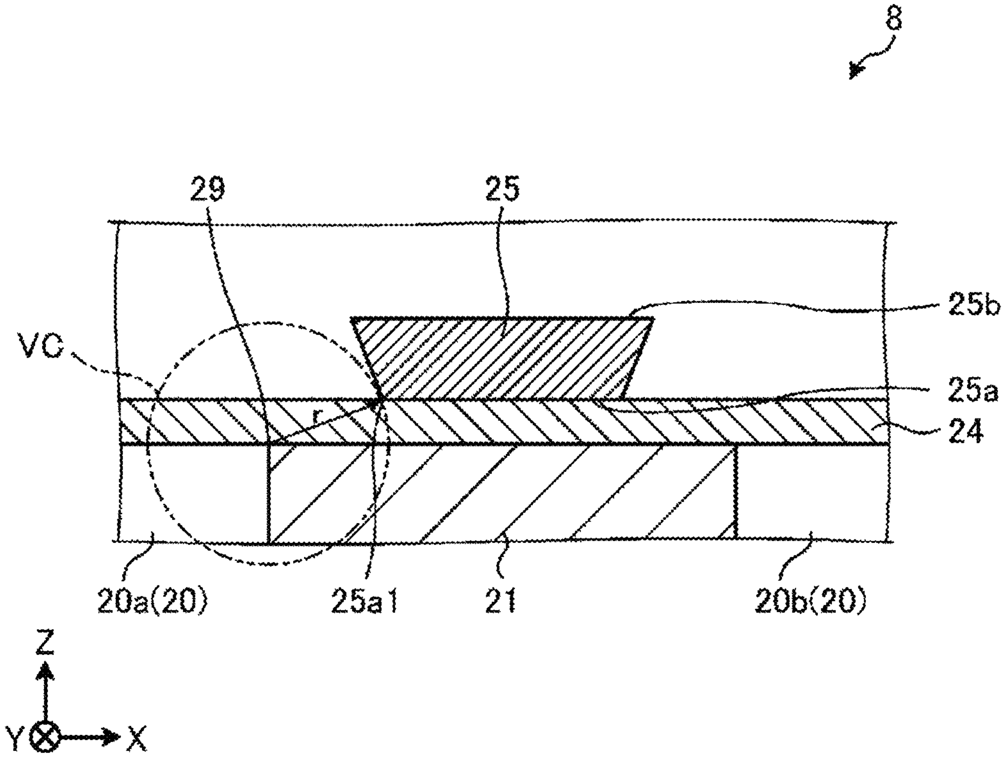
FIG. 14 is a cross-sectional view illustrating an example of an overall configuration of a liquid discharge head according to a ninth embodiment.

FIG. 14 is a cross-sectional view illustrating an overall configuration of a liquid discharge head according to a ninth embodiment. As illustrated in FIG. 14, in the liquid discharge head 8, between the wiring line 25 and an opening end 29 of the first pressure chamber 20*a* on a side of the pressure chamber girder 21, a distance to an end portion 25*al* of the first end surface 25*a* facing the vibration plate 24 on a side of the first pressure chamber 20*a* is a radius r, and the wiring line 25 need not be positioned within a virtual circle VC when viewed in cross-section along the virtual circle VC with the opening end 29 as a center. As a result, the wiring line 25 is less likely to be positioned on the pressure chamber 20, and thus the failure of hindering the displacement of the pressure chamber 20 can be reduced. An increase in size of the liquid discharge head 8 due to manufacturing convenience in consideration of a possibility of position shift of the wiring line 25 from a predetermined position in the X axis direction can be reduced. Failure such as aggregation of a liquid positioned inside the pressure chamber 20 due to an electric field generated by energization of the wiring line 25 can be made less likely to occur, and reliability of the liquid discharge head 8 can be improved.

Note that, although FIG. 14 illustrates the example in which the wiring line 25 is positioned on the vibration plate 24, the present disclosure can also be applied to a case in which the wiring line 25 is positioned on the insulation layer 26 as illustrated in FIG. 5.

Manufacturing Method for Liquid Discharge Head

Next, an example of a manufacturing method for the liquid discharge head 8 according to the first embodiment will be described. First, two or more of the pressure chambers 20 including the first pressure chamber 20*a* and the second pressure chamber 20*b* next to each other in the X axis direction, and the pressure chamber girder 21 positioned between the first pressure chamber 20*a* and the second pressure chamber 20*b* are formed. Next, the vibration plate 24 is positioned to overlap both the first pressure chamber 20*a* and the second pressure chamber 20*b* in a plan view. Two or more of the individual electrodes 35 are positioned respectively to overlap the two or more pressure chambers 20 in a plan view. Two or more wiring lines are electrically connected to the two or more individual electrodes 35, respectively. The insulation layer 26 is positioned between the vibration plate 24 and the wiring line 25 positioned to overlap the pressure chamber girder 21 in a plan view among the two or more wiring lines. At this time, the insulation layer 26 is prepared that includes the first surface 26*a* facing the vibration plate 24 and the second surface 26*b* facing the wiring line 25 and in which a length of the first surface 26*a* in the X axis direction is smaller than a length of the second surface 26*b*, and the insulation layer 26 is positioned to overlap the pressure chamber girder 21 in a plan view. As a result, the liquid discharge head 8 according to the present embodiment is obtained.

Subsequently, an example of a manufacturing method for the liquid discharge head 8 according to the seventh embodiment will be described. First, two or more of the pressure chambers 20 including the first pressure chamber 20*a* and the second pressure chamber 20*b* next to each other in the X axis direction, and the pressure chamber girder 21 positioned between the first pressure chamber 20*a* and the second pressure chamber 20*b* are formed. Next, the vibration plate 24 is positioned to overlap both the first pressure chamber 20*a* and the second pressure chamber 20*b* in a plan view. Two or more of the individual electrodes 35 are positioned respectively to overlap the two or more pressure chambers 20 in a plan view. Two or more wiring lines are electrically connected to the two or more individual electrodes 35, respectively. At this time, among the two or more wiring lines, the wiring line 25 that includes the first end surface 25*a* facing the vibration plate 24 and the second end surface 25*b* positioned opposite to the first end surface 25*a* and in which a length of the first end surface 25*a* in the X axis direction is smaller than a length of the second end surface 25*b* is positioned to overlap the pressure chamber girder 21 in a plan view. As a result, the liquid discharge head 8 according to the present embodiment is obtained.

Even the liquid discharge head 8 according to another embodiment can be manufactured as the same as and/or similar to the liquid discharge head 8 according to each of the above-described embodiments. Note that the manufacturing method for the liquid discharge head 8 according to each of the embodiments described above is merely an example, and there is no limitation on, for example, the order of the respective processes.

As described above, the liquid discharge head 8 according to the embodiment includes the two or more pressure chambers 20, the pressure chamber girder 21, the vibration plate 24, the two or more individual electrodes 35, the two or more wiring lines, and the insulation layer 26. The two or more pressure chambers 20 include the first pressure chamber 20*a* and the second pressure chamber 20*b* next to each other in the first direction. The pressure chamber girder 21 is positioned between the first pressure chamber 20*a* and the second pressure chamber 20*b*. The vibration plate 24 is positioned to overlap both the first pressure chamber 20*a* and the second pressure chamber 20*b* in a plan view. The two or more individual electrodes 35 are positioned respectively to overlap the two or more pressure chambers 20 in a plan view. The two or more wiring lines are electrically connected to the two or more individual electrodes 35, respectively. The insulation layer 26 is positioned between the vibration plate 24 and the on-girder wiring line (wiring line 25) positioned to overlap the pressure chamber girder 21 in a plan view among the two or more wiring lines. The insulation layer 26 includes the first surface 26*a* facing the vibration plate 24 and the second surface 26*b* facing the on-girder wiring line (wiring line 25), and is positioned to overlap the pressure chamber girder 21 in a plan view. The length of the first surface 26*a* in the first direction is smaller than the length of the second surface 26*b* in the first direction. As a result, according to the liquid discharge head of the embodiment, failure caused by position shift of the insulation layer 26 and/or the wiring line 25 can be reduced.

The liquid discharge head 8 includes the two or more pressure chambers 20, the pressure chamber girder 21, the vibration plate 24, the two or more individual electrodes 35, and the two or more wiring lines. The two or more pressure chambers 20 include the first pressure chamber 20*a* and the second pressure chamber 20*b* next to each other in the first direction. The pressure chamber girder 21 is positioned between the first pressure chamber 20*a* and the second pressure chamber 20*b*. The vibration plate 24 is positioned to overlap both the first pressure chamber 20*a* and the second pressure chamber 20*b* in a plan view. The two or more individual electrodes 35 are positioned respectively to overlap the two or more pressure chambers 20 in a plan view. The two or more wiring lines are electrically connected to the two or more individual electrodes 35, respectively. The on-girder wiring line (wiring line 25) positioned to overlap the pressure chamber girder 21 in a plan view among the two or more wiring lines includes the first end surface 25*a* facing the vibration plate 24 and the second end surface 25*b* positioned opposite to the first end surface 25*a*. The length of the first end surface 25*a* in the first direction is smaller than the length of the second end surface 25*b* in the first direction. As a result, according to the liquid discharge head of the embodiment, the failure caused by the position shift of the wiring line 25 can be reduced.

Further effects and variations can be readily derived by those skilled in the art. Thus, a wide variety of aspects of the present invention are not limited to the specific details and representative embodiments represented and described above. Accordingly, various changes can be made without departing from the spirit or scope of the general inventive concepts defined by the appended claims and their equivalents.

The invention claimed is:

1. A liquid discharge head, comprising:
- a first pressure chamber;
- a second pressure chamber next to the first pressure chamber in a direction;
- a girder between the first pressure chamber and the second pressure chamber in the direction;
- a vibration plate overlapping on the first pressure chamber, the second pressure chamber and the girder;
- a first individual electrode over the first pressure chamber;
- a second individual electrode over the second pressure chamber;
- an insulation layer on the vibration plate over the girder, the insulation layer comprising:
  - a first surface in contact with the vibration plate, having a first length in the direction; and
  - a second surface opposite to the first surface, having a second length in the direction, the first length smaller than the second length; and
- a first on-girder wiring line on the second surface.

2. The liquid discharge head according to claim 1, wherein
- the on-girder wiring line comprises;
- a first end surface in contact with the insulation layer, having a third length in the direction; and
  - a second end surface positioned opposite to the first end surface, having a fourth length in the direction, the third length smaller than the fourth length.

3. The liquid discharge head according to claim 1, wherein the on-girder wiring line comprises;
- a first end surface in contact with the insulation layer, having a third length in the direction; and
- a second end surface positioned opposite to the first end surface, having a fourth length in the direction, the third length larger than the fourth length.

4. The liquid discharge head according to claim 1, further comprising a second on-girder wiring line that is on the second surface, wherein
- the first on-girder wiring line comprises:
  - a first end surface in contact with the insulation layer, having a third length in the direction; and
  - a second end surface opposite to the first end surface, having a fourth length in the direction,
- the second on-girder wiring line comprises:
  - a third end surface in contact with the insulation layer, having a fifth length in the direction; and
  - a fourth end surface opposite to the third end surface, having a sixth length in the direction, and
- a summation of the third length and the fifth length is smaller than a summation of the fourth length and the sixth length.

5. The liquid discharge head according to claim 1, further comprising:
- three or more of on-girder wiring lines including the on-girder wiring line arranged in the direction,
- wherein each of the three or more on-girder wiring lines comprises a corresponding first end surface in contact with the insulation layer and a corresponding second end surface opposite to the first end surface, and
- in the on-girder wiring lines at two ends in the direction, a summation of each length of the three or more first end surfaces in the direction is smaller than a summation of each length of the three or more second end surfaces in the direction.

6. The liquid discharge head according to claim 5, wherein
- in one or more of the on-girder wiring lines positioned in a center portion in the direction, a difference between the summation of the lengths of the second end surfaces in the direction and the summation of the lengths of the first end surface in the direction is smaller than the difference in the on-girder wiring lines at the two ends in the direction.

7. The liquid discharge head according to claim 4, further comprising:

three or more of the on-girder wiring lines arranged in the direction, wherein, in one or more of the on-girder wiring lines positioned in the center portion in the direction, a length of the first end surface in the direction is larger than a length of the second end surface in the direction.

8. A liquid discharge head, comprising:

a first pressure chamber;

a second pressure chamber next to the first pressure chamber in a direction;

a girder between the first pressure chamber and the second pressure chamber in the direction;

a vibration plate overlapping on the first pressure chamber, the second pressure chamber and the girder;

a first individual electrode over the first pressure chamber;

a second individual electrode over the second pressure chamber;

an first on-girder wiring line over the girder, the first on-girder wiring line comprising:

a first end surface facing the vibration plate having a first length in the direction; and a second end surface opposite to the first end surface, and having a second length in the direction, the first length smaller than the second length.

9. The liquid discharge head according to claim 8, further comprising:

a protective layer covering the first on-girder wiring line, wherein a thickness in the direction of the protective layer in the first end surface is larger than a thickness in the direction of the protective layer in the second end surface, and a length in the direction of an end surface of the protective layer opposite to the first end surface is equal to or larger than a length in the direction of the first on-girder wiring line and the protective layer in the first end surface, the first on-girder wiring line being interposed between the protective layer.

10. The liquid discharge head according to claim 1, wherein the first pressure chamber comprises a first end in contact with the girder and the vibration plate, the first on-girder wiring line comprises:

a third surface; and a fourth surface opposed to the first surface, and closer to the girder than the third surface, the fourth surface comprising, in a cross section perpendicular to the fourth surface, a second end and a third end opposed to the second end, wherein the second end is closer to the first pressure chamber than the third end; and the first on-girder wiring line is, in the cross section, on or outside a distance between the first end and the second end.

11. A recording device, comprising:

the liquid discharge head according to claim 1.

12. A manufacturing method for a liquid discharge head, comprising:

forming:

a first pressure chamber;

a second pressure chamber next to the first pressure chamber in a direction; and a girder between the first pressure chamber and the second pressure chamber in the direction;

positioning a vibration plate to overlap on the first pressure chamber, the second pressure chamber, and the girder;

positioning:

a first individual electrode over the first pressure chamber; and a second individual electrode over the second pressure chamber; and positioning an insulation layer on the vibration plate over the girder, the insulation layer comprising:

a first surface in contact with the vibration plate, having a first length in the direction; and a second surface facing the wiring line opposite to the first surface, having a second length in the direction, the first length smaller than the second length; and a first on-girder wiring line on the second surface.

13. A manufacturing method for a liquid discharge head, comprising:

forming:

a first pressure chamber;

a second pressure chamber next to the first pressure chamber in a direction; and a girder between the first pressure chamber and the second pressure chamber in the direction;

positioning a vibration plate to overlap on the first pressure chamber, the second pressure chamber and the girder;

positioning:

a first individual electrode over the first pressure chamber; and a second individual electrode over the second pressure chamber;

a first on-girder wiring line over the girder, the first on-girder wiring line comprising:

a first end surface facing the vibration plate having a first length in the direction; and a second end surface opposite to the first end surface, and having a second length in the direction, the first length smaller than the second length.

14. The liquid discharge head according to claim 1, further comprising:

a third pressure chamber; and a third electrode on the plate over the third chamber, wherein the first on-girder wiring line is electrically coupled to the third electrode.

15. The liquid discharge head according to claim 8, wherein the first pressure chamber comprises a first end in contact with the girder and the vibration plate, the first on-girder wiring line comprises:

a third surface; and a fourth surface opposed to the first surface, and closer to the girder than the third surface, the fourth surface comprising, in a cross section perpendicular to the fourth surface, a second end and a third end opposed to the second end, wherein the second end is closer to the first pressure chamber than the third end; and the first on-girder wiring line is, in the cross section, on or outside a distance between the first end and the second end.

16. A recording device, comprising:

the liquid discharge head according to claim 8.

* * * * *